June 9, 1931.  T. STENHOUSE  1,809,794

GLASS FEEDER

Filed July 8, 1927

Inventor

Thomas Stenhouse.

By Eccleston & Eccleston

Attorneys

Patented June 9, 1931

1,809,794

UNITED STATES PATENT OFFICE

THOMAS STENHOUSE, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA

GLASS FEEDER

Application filed July 8, 1927. Serial No. 204,233.

The invention relates to that type of glass feeder in which the air pressure on the surface of the glass is alternately increased and decreased, to thereby accelerate and retard or stop the flow of glass, to form shaped gobs or charges, which are severed in the well known manner, and drop into molds to be formed into articles.

It is old, of course, to form shaped, suspended gobs by means of variations in the pressure on the glass surface, but one of the objects of the present invention is to provide means for producing this variation in pressure, which will be more effective, in that the means will be associated immediately with the flow spout, as distinguished from the prior constructions in which the air pressure controlling means is located at some distance from the flow spout and communicates therewith by means of a pipe or tube.

A further object of the invention is to provide a glass feeder of this character with improved means for increasing the effect of the pressure and vacuum by causing the pressure and vacuum to act solely on the glass within the pressure chamber, that is, to prevent the force of the pressure and vacuum from being dissipated on the glass between the pressure chamber and the tank.

Another object of the invention is to provide a glass feeder of this character with improved means for maintaining the glass in the pressure chamber at a predetermined level, independently of the level or variations in the level of the glass in the flow spout and tank.

Still another object of the present invention is to provide an improved adjustable timing mechanism for regulating and controlling the operation of the various valves of feeders or forming machines.

Further advantages of the invention will be apparent from the following detailed description, when taken in connection with the accompanying drawings; in which Figure 1 is a vertical sectional view of the feeder mechanism, together with a portion of the conventional flow spout.

Figure 1:
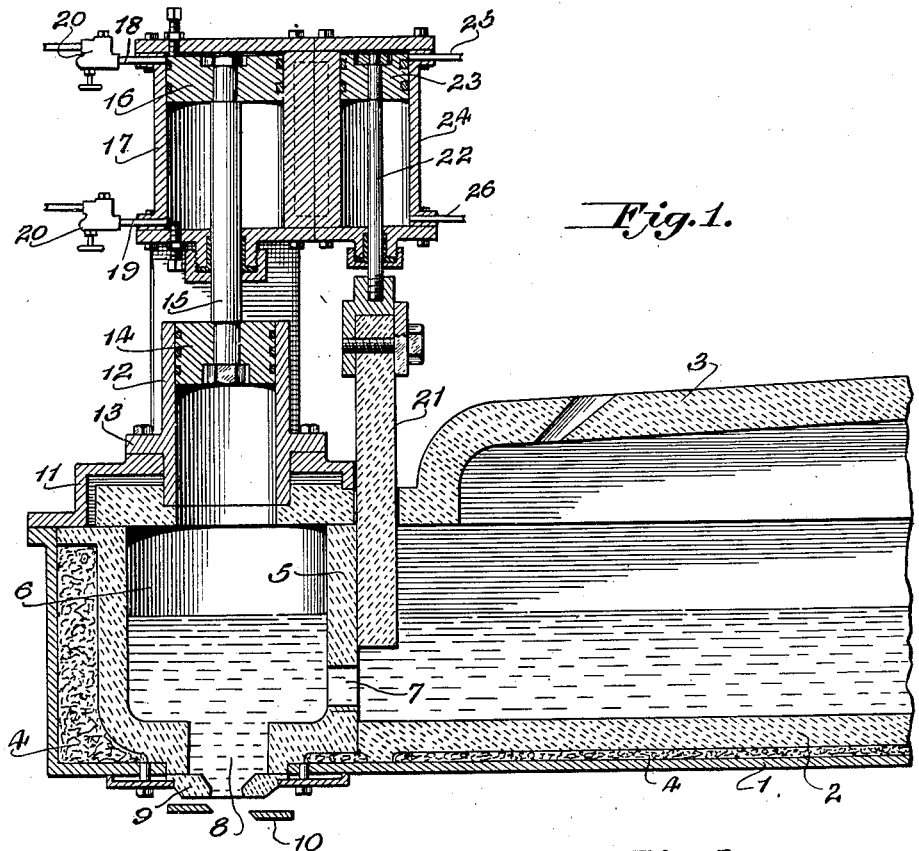

Referring to the drawings more in detail, numeral 1 indicates the casing of a conventional flow spout 2, having the usual cover 3. The flow spout is mounted on and communicates with the melting tank in accordance with the ordinary constructions; and needless to say, there are a plurality of these flow spouts for each melting tank. The flow spout is, of course, formed of refractory material, and is preferably provided with an outer layer of suitable heat insulating material 4. The flow spout is also provided with the usual burners (not shown). A dividing wall 5 is transversely arranged in the flow spout, dividing it into two separate portions, and that portion of which is associated with the feeder, I term the pressure chamber, which chamber is indicated by numeral 6. Communication between the pressure chamber and the remainder of the flow spout is provided by means of the port 7 in the dividing wall 5; the port being controlled by a gate to be hereinafter described.

While I have shown a packing of heat insulating material around the end of the flow spout constituting the pressure chamber, yet it will be understood that, if desired, this heat insulating material may be spaced from the wall of the pressure chamber to form a muffle oven, thereby providing additional means for controlling the temperature of the glass in the pressure chamber.

Numeral 8 indicates the usual flow orifice, having the ordinary bushing 9. In accordance with the established practice, these bushings are removable and are of various sizes according to the ware being manufactured. Arranged below the flow orifice are shears 10, for severing the formed charges or gobs, which then drop into molds to be formed into various articles. The shears are merely illustrated diagrammatically, as they are well known in the glass industry, and are preferably operated by the usual air cylinder (not shown).

As stated hereinbefore, it is common knowledge to feed suspended formed glass charges by means of variations in the air pressure on the surface of the glass, but one of the advantages of the present invention resides in associating the air pump directly with the pressure chamber. This feature of the invention will now be described.

The pressure chamber 6 is maintained air-tight by means of a cover 11 which is bolted or otherwise secured to the casing 1. This cover is provided with a suitable opening to receive a cylinder 12, and the cylinder is preferably provided with a flange 13 which rests on the cover and is secured thereto by bolts. A piston 14 is slidably mounted for vertical reciprocation in the cylinder 12, to produce an alternate suction and pressure. The piston 14 is carried by a piston rod 15 which is connected at its upper end to the piston 16 of cylinder 17. Air lines 18 and 19 lead to the top and bottom, respectively, of the cylinder 17, and each of the air lines is preferably provided with an adjustable check valve 20 adjacent the cylinder. These adjustable check valves may be arranged to regulate either the admission or the exhaust of the motive fluid, in the well known manner, to regulate the speed of travel of the piston 16, as well as to provide a cushioning effect therefor. It will be understood, of course, that the timing shaft controls the valves which permit the motive fluid to be admitted to or exhausted from the air lines 18 and 19 leading to the cylinder. It is sometimes desirable to alter the limits of stroke of the piston 16, and for this purpose I have provided each end of the cylinder with a threaded bolt or rod, which may be screwed into the cylinder to the desired extent.

The downward movement of the piston 14 will increase the pressure in the pressure chamber, thereby accelerating the gravity flow of glass through the flow orifice; and movement of the piston in the opposite direction will retard or stop the flow of glass; the charge being thus formed in the well known manner, is severed and drops into a mold. But in the particular feeder disclosed herein, the pressure and vacuum generating means is immediately associated with the pressure chamber of the flow spout, and it will therefore be apparent that the action produced by the variations in pressure will be more effective, and that therefore the size, shape and weight of the gobs may be more sensitively controlled.

As stated hereinbefore, another advantage of the present invention resides in the provision of means for preventing the dissipation of the force produced by the alternate pressure and vacuum in the pressure chamber; and to retain the glass in the pressure chamber at a predetermined level, irrespective of the level or variations in the level, of the glass in the flow spout or tank. To accomplish these functions, I have provided the flow spout with a gate 21 to cooperate with the port 7 to intermittently open and close it. The gate is carried by a piston rod 22 connected to a piston 23 in a cylinder 24. Air lines 25 and 26 lead to the top and bottom, respectively, of the cylinder 24; and the admission and exhaust of air in these lines is controlled by an adjustable timing mechanism. In the preferred operation, the gate 21 will temporarily close the port 7 to shut off communication between the pressure chamber and the remainder of the flow spout, while pressure is being applied to accelerate the flow of glass through the flow orifice, and when the vacuum is initially applied to retard or stop the flow of glass through the flow spout. In this manner the effect of the pressure and vacuum will be applied only to the glass in the pressure chamber, and will not be dissipated throughout the remainder of the flow spout. After the vacuum has been initially applied to retard, stop, or retract the flow of glass through the flow orifice, the gate 21 will be opened to permit a quantity of glass to flow into the pressure chamber, equal in volume to the amount of glass which has just been expelled as a charge through the flow orifice.

The above is merely a description of one manner of operation, for the pressure and vacuum means is controlled independently of the gate, and it will therefore be apparent that instead of having the gate closed when the pressure is applied, the gate may be open or partly open, or it may be open part of the time the pressure is being applied and closed part of that time. And likewise instead of having the gate closed when the vacuum is initially applied, it may be open or partly open; and it may be opened or closed at any desired time during the pressure applying period, or during the vacuum applying period. In other words, by the entirely independent control of the gate and the pneumatic feeder I obtain a flexibility of operation which gives an unusually wide control of the weight, shape and size, of the charges.

Figures 2, 3:
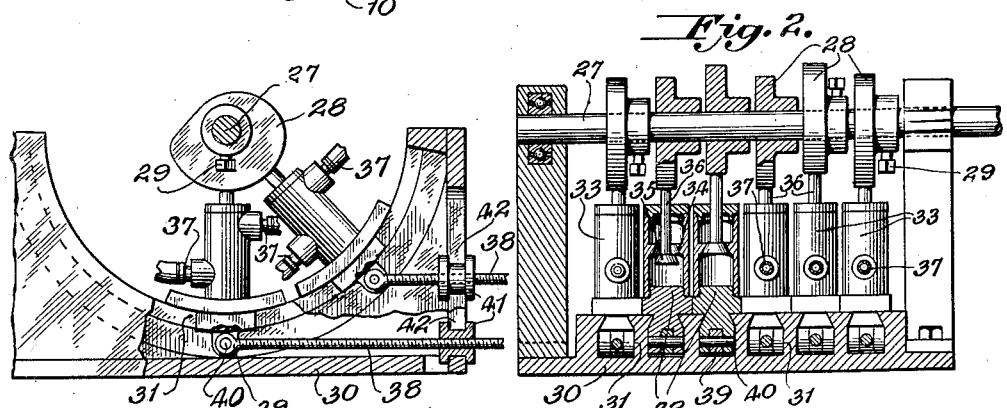
Figure 2 is a side view of the timing mechanism; parts being in section.
Figure 3 is an end elevational view of the timing mechanism; parts being broken away to more clearly show the construction.

The timing mechanism will now be described, reference being had particularly to Figures 2 and 3.

Numeral 27 indicates an ordinary timing shaft, having a series of cams 28 mounted thereon. The cams are preferably secured to the shaft by means of set screws 29; and while I have illustrated six of the cams, it will be understood that the number may be greater or less, depending on the particular requirements. Numeral 30 indicates a casing provided with six arcuate guide ways 31, one for each cam; the arcuate guide ways being concentric with the shaft 27. Slidably mounted in each of these guide ways, preferably by means of a dovetail fit, is a block 32, and secured to each block is a valve casing 33. Each valve casing is provided with the usual valve seat 34, valve 35 and valve stem 36, the latter cooperating with its associated cam in the usual manner. Each valve is also provided with two ports 37, one of which is connected by piping or tubing with a source of compressed air, and the other of which is connected with one end of a cylinder to be operated.

Any suitable means may be employed for independently adjusting the slide blocks, and the valves carried thereby, in the arcuate slides. In the specific form shown herein I employ a rod 38 for each slide block; each rod having an eye 39 at its end, by which it is pivotally connected to the under side of a block by means of a pin 40. The rods are threaded, and mounted on each rod is a nut 41; each nut being vertically slidable in an appropriate slot 42 in the casing or housing 30. By this means each valve casing is independently adjustable through a large arc.

The operation of this timing mechanism will be understood from the foregoing description of the preferred construction, but it may be briefly described as follows:

The valves are connected in the usual manner with the cylinder to be operated, and will alternately admit and exhaust the compressed air at opposite end of the cylinders. The cams will be set on the shaft 27 to operate the valves in the proper sequence. If now it is desired to change the time of opening or closing any particular valve, it is only necessary for the operator to rotate the screw 41, of the particular valve to be adjusted, in the proper direction and to the proper extent, to thereby move the valve in relation to its cam, and thereby causing the cam to act on the valve either earlier or later. The above described mechanism constitutes a very simple and efficient device for timing the operation of valves, and while I have described the device in connection with the particular feeder disclosed herein, it will be understood that it is adapted for use in connection with any feeder or forming machine which employs cylinders for the operation of any of its elements. It has been deemed unnecessary to illustrate the connections between the valves and the cylinders, as these connections are made in the usual and well known manner.

Having fully described the invention, what I claim as new and desire to secure by Letters Patent is:

1. A glass feeder including a flow spout having a flow orifice, a pressure chamber associated with the flow orifice, an open-ended cylinder associated with and forming in effect an extension of said pressure chamber, and a piston reciprocable in said cylinder for producing variations in pressure in the pressure chamber, to alternately accelerate and retard the flow of glass through the flow orifice.

2. A glass feeder including a flow spout having a flow orifice, a pressure chamber associated with the flow orifice, an open-ended cylinder associated with and forming in effect an extension of said pressure chamber, a piston reciprocable in said cylinder for producing variations of pressure in the pressure chamber, and a piston and cylinder for operating the first-mentioned piston.

3. A timing mechanism including a rotatable shaft, cams mounted on said shaft, guideways arranged concentrically of said shaft, a valve mounted for sliding movement in each of said guideways, and means for independently adjusting each valve in its guideway.

4. A timing mechanism including a shaft having a plurality of cams, guideways arranged concentrically of the shaft, a plurality of valves arranged concentrically of said cams in said guideways, means for causing relative rotary movement between the cams and the valves, and means for adjusting each valve in a path concentric of its associated cam.

THOMAS STENHOUSE.